US007979512B2

(12) United States Patent
Chandrasekhar et al.

(10) Patent No.: US 7,979,512 B2
(45) Date of Patent: Jul. 12, 2011

(54) SERVICE DELIVERY ONLINE

(75) Inventors: Arun Ramanathan Chandrasekhar, Bellevue, WA (US); Purushottam Shridhar Amradkar, Bellevue, WA (US); Roy Peter D'Souza, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 12/267,230

(22) Filed: Nov. 7, 2008

(65) Prior Publication Data

US 2010/0121902 A1 May 13, 2010

(51) Int. Cl.
G06F 15/16 (2006.01)
(52) U.S. Cl. ......... 709/219; 709/220; 709/228; 370/230
(58) Field of Classification Search .................. 709/224, 709/227, 232, 217, 219; 726/12; 370/230
See application file for complete search history.

(56) References Cited

U.S. PATENT DOCUMENTS

| | | | |
|---|---|---|---|
| 6,769,019 B2 * | 7/2004 | Ferguson | 709/219 |
| 6,789,110 B1 * | 9/2004 | Short et al. | 709/221 |
| 7,133,933 B2 * | 11/2006 | Shah et al. | 709/248 |
| 7,356,615 B2 | 4/2008 | Cai et al. | |
| 7,499,995 B2 * | 3/2009 | Armstrong | 709/224 |
| 2003/0005034 A1 | 1/2003 | Amin | |
| 2005/0203913 A1 | 9/2005 | Sundararajan et al. | |
| 2006/0041669 A1 * | 2/2006 | Bemmel et al. | 709/229 |
| 2006/0245564 A1 | 11/2006 | Li et al. | |
| 2007/0186099 A1 * | 8/2007 | Beck et al. | 713/159 |
| 2007/0256083 A1 | 11/2007 | Vayssiere | |
| 2007/0282692 A1 | 12/2007 | Bishop et al. | |
| 2009/0276771 A1 * | 11/2009 | Nickolov et al. | 717/177 |
| 2010/0020685 A1 * | 1/2010 | Short et al. | 370/230 |
| 2010/0071053 A1 * | 3/2010 | Ansari et al. | 726/12 |
| 2010/0125612 A1 * | 5/2010 | Amradkar et al. | 707/802 |
| 2010/0332615 A1 * | 12/2010 | Short et al. | 709/217 |

OTHER PUBLICATIONS

HCL Technologies Introduces New Breed SaaS Service Delivery Platform, http://www.web2journal.com/read/555173.htm, Apr. 29, 2008, 3 Pages.
HP Service Delivery Platform Third Party Framework, http://h71028.www7.hp.com/ERC/downloads/4AA0-3211ENW.pdf, Jul. 2006, 4 Pages.
Roy Rubenstein, Tech Briefing: SaaS: Centre Stage, http://www.broadsoft.com/Newsroom/SaaS-article.pdf, Feb. 2008, 4 Pages.
Oracle SaaS Platform is Leading Choice for Growing Number of Companies Offering Software as a Service, http://www.oracle.com/corprate/press/2007_nov/oracle-saas-platform.html, Nov. 12, 2007, 3 Pages.

* cited by examiner

*Primary Examiner* — Khanh Q Dinh
(74) *Attorney, Agent, or Firm* — Workman Nydegger

(57) ABSTRACT

In one embodiment, a computer system configures an online service to function as a service delivery platform, where the online service includes a plurality of service delivery platform components configured to process inputs received from services that are to be hosted by the online service. The computer system receives an indication that a service is to be hosted using the online service, where the indication includes a service configured for hosting by the online service and a portion of use information indicating how the service delivery platform components are to be used to host the service for various computer clients. The computer system processes the portion of use information received with the indication to configure the service delivery platform components in an appropriate manner for hosting the service and provides the hosted service to computer clients in the appropriate manner as determined by the accessed use information.

19 Claims, 3 Drawing Sheets

SERVICE DELIVERY ONLINE

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a client computer system might connect to a server in a datacenter to access a service. The service could provide simple or very complex functionality, and may be able to communicate with other services in the process. Such services are often referred to as software as a service or SAAS.

In some cases, it may be desirable for a developer of a service to offload the finalized service to another person or business for hosting. Such hosting businesses often have proprietary implementations in place, requiring the developer to add specific scripts or other code to enable communication between the hosting company's servers and the developer's service. Moreover, in many cases, hosting servers can only handle limited numbers of user-submitted services.

BRIEF SUMMARY

Embodiments described herein are directed to providing an online service configured to function as a service delivery platform where the online service includes a plurality of service components. In one embodiment, a computer system configures an online service to function as a service delivery platform, where the online service includes a plurality of service delivery platform components configured to process inputs received from services that are to be hosted by the online service. The computer system receives an indication that a service is to be hosted using the online service, where the indication includes a service configured for hosting by the online service and a portion of use information indicating how the service delivery platform components are to be used to host the service for various computer clients. The computer system processes the portion of use information received with the indication to configure the service delivery platform components in an appropriate manner for hosting the service and provides the hosted service to computer clients in the appropriate manner as determined by the accessed use information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
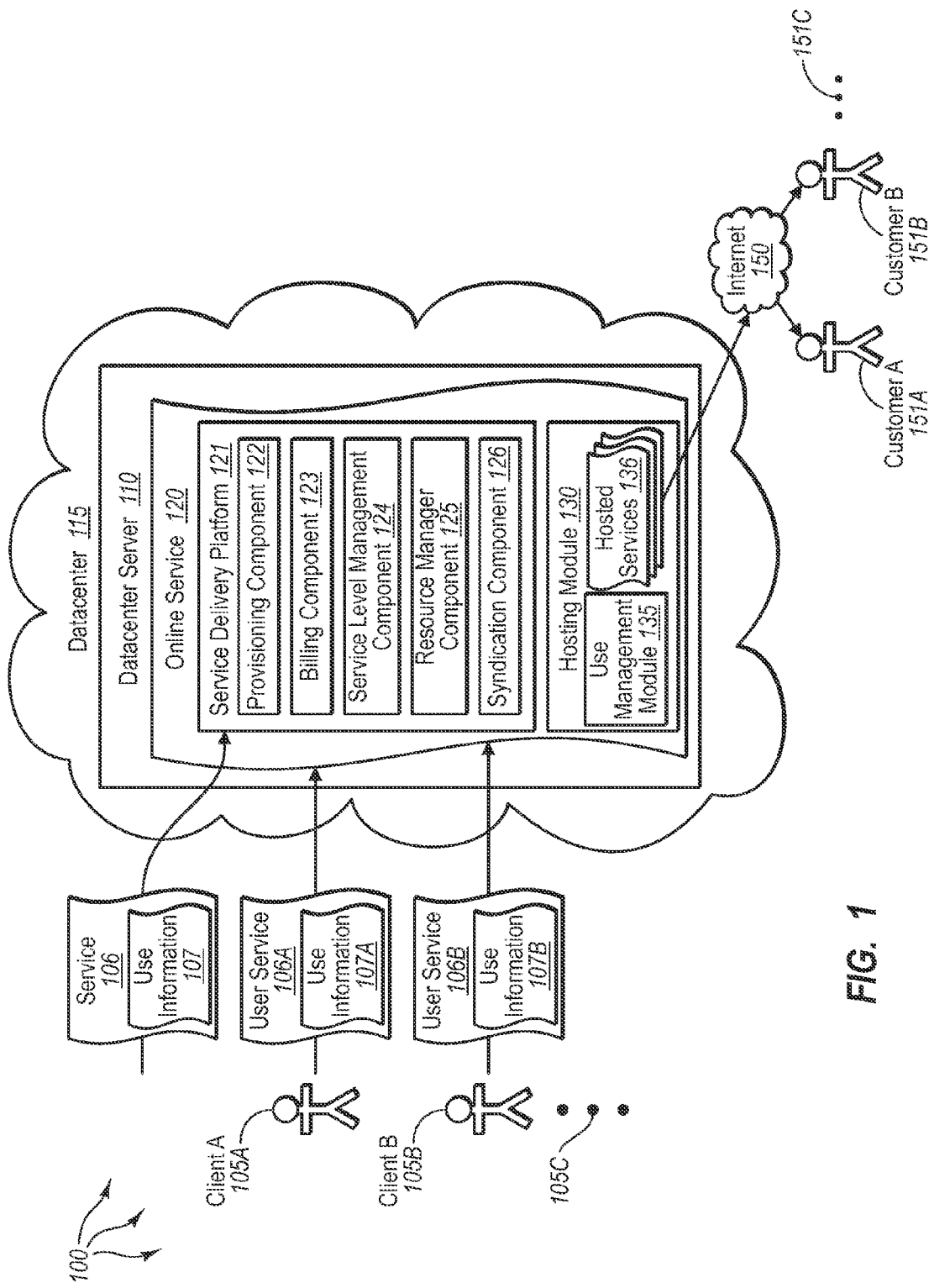
FIG. 1 illustrates a computer architecture in which embodiments of the present invention may operate including providing an online service configured to function as a service delivery platform.

Embodiments described herein are directed to providing an online service configured to function as a service delivery platform where the online service includes a plurality of service components. In one embodiment, a computer system configures an online service to function as a service delivery platform, where the online service includes a plurality of service delivery platform components configured to process inputs received from services that are to be hosted by the online service. The computer system receives an indication that a service is to be hosted using the online service, where the indication includes a service configured for hosting by the online service and a portion of use information indicating how the service delivery platform components are to be used to host the service for various computer clients. The computer system processes the portion of use information received with the indication to configure the service delivery platform components in an appropriate manner for hosting the service and provides the hosted service to computer clients in the appropriate manner as determined by the accessed use information.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes datacenter 115. Datacenter 115 may include one or more data servers, each configured to provide the same or different services. In some cases, servers in datacenter 115 (e.g. datacenter server 110) may be configured to communicate with other servers and/or clients through other (remotely located) datacenters. Such communication may occur over the internet or other type of computer network. Datacenter server 110 may be configured to provide an online service 120 which includes service delivery platform 121 and hosting module 130. Service delivery platform 121 may include a variety of different components including, but not limited to, provisioning component 122, billing component 123, service level management component 124, resource manager component 125 and syndication component 126. These components will be described in greater detail below.

As used herein, an online service may be any type of resource or application provided over a network connection such as the internet. Online services may be configured to provide various types of functionality according to how each service is programmed. In some cases, a person or company may develop an online service configured to provide a certain piece of functionality, and upload the service to a datacenter for delivery to users. For example, client A (105A) may develop an online service that provides outside access to files stored on a home computer (e.g. service 106A). Client A may then upload user service 106A to datacenter with the intent that datacenter server 110 will provide the hosted services 136 to customers A (151A), B (151B) and/or other customers (151C) over a network (e.g. internet 150). Similarly, client B (105B) or any other user (105C) may submit user services (106B) for hosting by datacenter server 110. Additionally or alternatively, datacenter server 110 may receive service 106 from another computer system or other entity.

Online service 120, potentially one of many different services provided by datacenter server 110, includes service delivery platform 121 (herein SDP, or "platform"). SDP 121 may comprise a platform or interface that governs various parameters for hosting a user service. For example, client A may wish to indicate in use information 107A one or more instructions SDP 121 is to follow when hosting service 106A. For example, client A may indicate how customers are to be billed after using the user's service. Other functionality may also be indicated in use information 107A. Hosting module 130 may be configured to host the services (e.g. 136) according to the use information provided, as interpreted and managed by use management module 135. Optionally, platform 121 may communicate with clients to inform them about the services and components available in the platform. These services and components will be discussed in greater detail below with regard to method 200 of FIG. 2.

Figure 2:
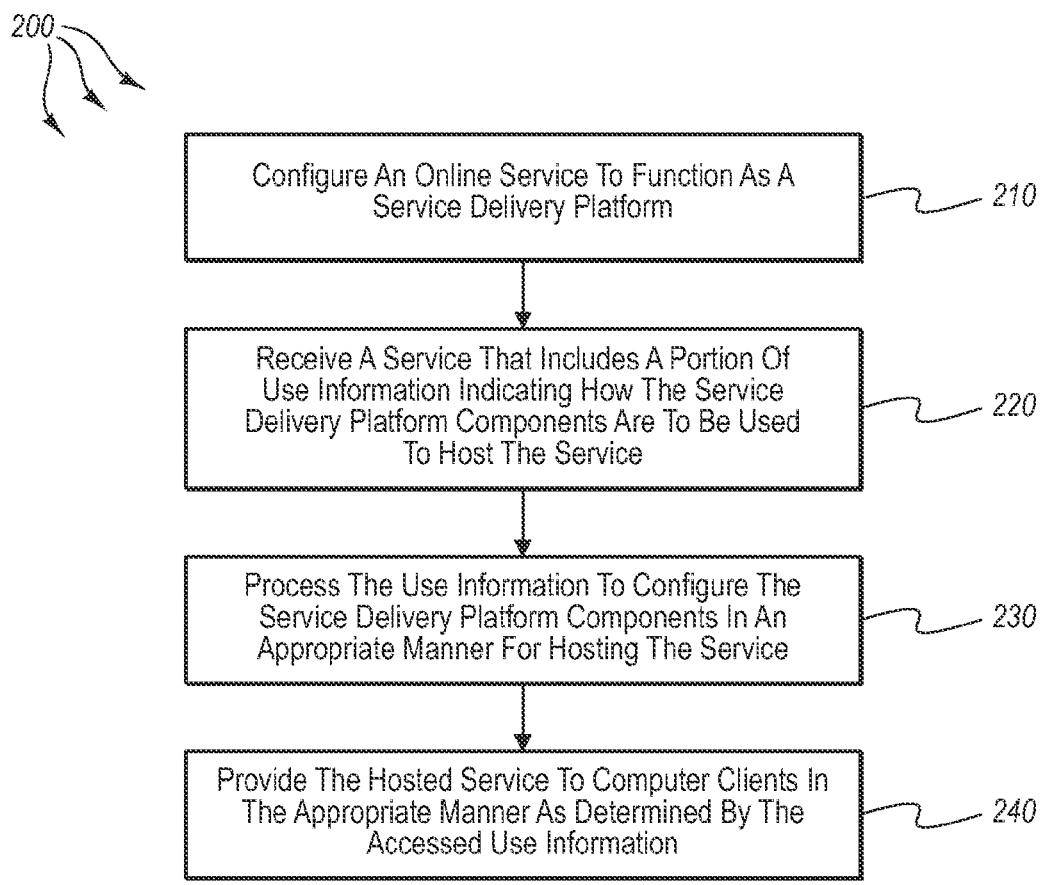
FIG. 2 illustrates a flowchart of an example method for providing an online service configured to function as a service delivery platform where the online service includes a plurality of service delivery platform components.

FIG. 2 illustrates a flowchart of a method 200 for providing an online service configured to function as a service delivery platform where the online service includes a plurality of service delivery platform components. The method 200 will now be described with frequent reference to the components and data of environment 100.

Method 200 includes an act of configuring an online service to function as a service delivery platform, the online service comprising a plurality of service delivery platform components configured to process inputs received from one or more services that are to be hosted by the online service (act 210). For example, online service 120 may be configured by datacenter server 110 to function as a service delivery platform (e.g. SDP 121). Online service 120 may include a plurality of SDP components configured to process inputs received from one or more services (e.g. service 106/106A/106B) that are to be hosted by hosting module 130 of online service 120. In some cases, online service 120 may be configured to communicate with and integrate with a plurality of other online services functioning as service delivery platforms. For example, online services hosted on other datacenter servers (not shown) or in other datacenters may be configured to communicate with and perform some of the processing related to various hosted services.

In addition to communicating with other services, online service 120 may be scalable to host virtually any number of submitted services. Thus, datacenter 115 may expand or communicate with other datacenter servers to balance the load and accommodate virtually any number of user- or computer-submitted services. Each of the submitted services may be able to take advantage of and implement any one or more of components 122-126. In each case, substantially complete data isolation may be provided for each submitted service. Data isolation ensures that when customers log in or otherwise access hosted services 136, each customer only has access to the information provided by the accessed service and does not have access to other information provided by other, different services also hosted by online service 120.

Method 200 includes an act of receiving an indication that a service is to be hosted using the online service, the indication including at least one service configured for hosting by the online service and at least one portion of use information indicating how the service delivery platform components are to be used to host the service for various computer clients (act 220). For example, online service 120 may receive user service 106B from client B (105B) with use information 107B indicating that service 106B is to be hosted by online service 120. The use information may indicate how service delivery platform 121 components (122-126) are to be used to host service 106B for client 105B.

In some cases, use information 107B may include at least a portion of metadata corresponding to one or more of the service delivery platform components. A developer or other type of client may include the metadata with the uploaded service to indicate how at least some of the SDP components are to be used when hosting the uploaded service. This may allow for seamless integration between the uploaded services and online service 120. In some embodiments, at least one of the service delivery platform components includes a provisioning component 122 configured to manage client/customer access rights regarding the service. For example, client B (105B) may indicate that for uploaded service 106B, provisioning component 122 of online service 120 is to be used to manage the access rights of customer 151A.

Thus, for example, when customer 151A attempts to access user service 106B (as one of hosted services 136 hosted by hosting module 130), the SDP provisioning component may use information 107B to determine whether and to what extent customer 151A is allowed to access information provided by service 106B. Provisioning component 122 may be configured to query the metadata to determine which resources associated with the service are to be provisioned. Upon determining which resources are to be provisioned, component 122 can determine that customer 151A has access to at least some of those resources, and will allow those resources to be accessed. Other types of data access provisioning may be provided by component 122, as requested by the use information/metadata. As indicated above, each of components 122-126 may be configured to indicate to potential clients which portions of functionality the component is capable of providing, as well as parameters that may be configured by the client.

In some embodiments, service delivery platform 121 includes billing component 123 configured to generate customer billing information regarding use of the service. Similar to the provisioning component, client 105A may include metadata in use information 107A indicating how billing component 123 is to be used in relation to user service 106A. In some cases, billing component 123 may include an aggregation engine configured to generate billable units according to a usage based or a subscription based system. For example, client 105A may indicate that when service 106A is accessed by a customer (e.g. 151B), the customer is to be billed. Billing increments as well as billing modalities may be customized and identified in use information 107A. The client may specify how small or large the billing increments are to be, and whether the billable units are to be based on total time of use, type or amount of content accessed, bandwidth used, or any other metric usable to properly bill a customer for use of the service.

In some embodiments, the service delivery platform includes service level management component 124 configured to monitor one or more quality of service metrics associated with the hosting of a service and report the informational results of the quality of service monitoring to the client. For example, client 105B may submit user service 106B with use information 107B indicating that service level management component 124 is to be implemented in the hosting of service 106B to monitor various quality of service (QoS) metrics associated with hosting. Use management module 135 of online service 120 may determine that, for example, available bandwidth is to be monitored by service level management component 124. Available bandwidth may indicate whether a certain QoS level is being met with regard to user-submitted service 106B. The results may be organized and reported to client 105B. Other metrics may also be monitored and reported to client 105B. In some cases, the service level management component may be configured to communicate with a trusted third party to determine whether SDP 121 is in compliance with a given service level agreement.

SDP 121 may also include resource manager component 125 configured to monitor and control expenditure of various host computer system resources. For instance, resource manager may monitor and control CPU usage, bandwidth, storage or any other type of resource provided by datacenter server 110. In some cases, resource manager component 125 may be configured to work with billing component 123 to generate billable units corresponding to any resource overuses by online service customers. For example, if customer 151A is using hosted service 136 and uses more resources (such as storage) than they are allowed, billing component 123 may be configured to generate billable units indicating overage charges. It should be understood that other components (including components not shown in FIG. 1) may be configured to work in tandem with components 122-126. In some cases, client 105 may elect to use all of components 122-126. In other cases, none or only a portion of the available components.

SDP 121 may also include syndication component 126 configured to bundle a plurality of services and provide them to other clients/customers. Thus, in some embodiments, client 105B (which may be a corporation or other small business entity) may provide a bundle of services that are to be used together. In some cases, a customer may be able to access the bundle of services, as issued by SDP 121. Each of the services in the bundle may be configured to use some or all of SDP components 122-126. On the flipside, one or more SDP components may be bundled and provided as a group to various datacenters for use in hosting user-submitted services. For example, a corporation may configure a group of components to provision access, bill, manage resources and monitor and maintain service levels in a predefined manner that may be uniform across all services they provide.

Returning to FIG. 2, method 200 includes an act of processing the portion of use information received with the indication to configure the service delivery platform components in an appropriate manner for hosting the service (act 230). For example, use management module 135 may process use information (e.g. 107) received with service 106 to configure SDP components 122-126 in the manner indicated in the use information. As indicated above, use information may include metadata. Such metadata may include a selection of a subset of service delivery platform components that are to be used in conjunction with hosting the submitted service.

Optionally, online service 120 may allow a client (e.g. 105B) to later update or change use information. The changes indicated in the updated use information may be dynamically applied by hosting module 130 to those services (i.e. user 105B's services) that are currently being hosted. This updating may occur automatically without user intervention, simply by submitting (or having online service 120 detect) new/updated use information. Use information 107 may be communicated to datacenter 115 using simple object access protocol (SOAP). Use information may be formatted as extensible markup language (XML) data or in another format. Additionally or alternatively, use information may include schemas such that a client could upload a schema which would specify how (and which) SDP components were to be used with a user-submitted service.

Method 200 includes an act of the online service providing the hosted service to one or more computer clients in the appropriate manner as determined by the accessed use information (act 240). For example, hosting module 130 may provide any of hosted services 136 to one or more clients or customers (e.g. 151A, 151B, 151C, etc.) in the appropriate manner as determined by the accessed use information (e.g. 107).

Figure 3:
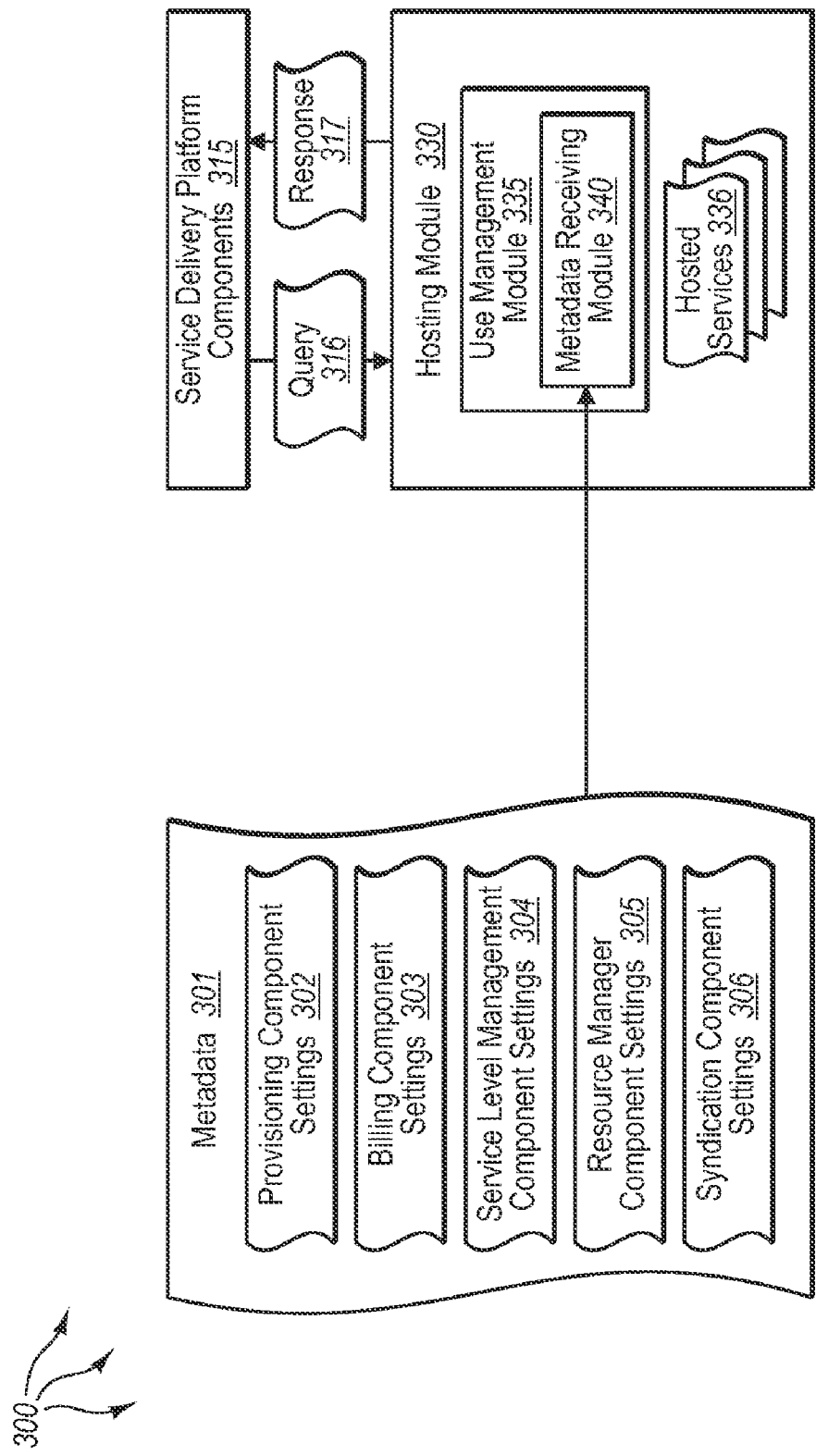
FIG. 3 illustrates an exemplary embodiment of the present invention in which a computer system may operate.

As illustrated in FIG. 3, use information may include metadata 301. Use management module 135 may determine the appropriate manner to host a service by determining which settings are to be applied to which SDP components. For example, metadata 301 may include provisioning component settings 302, billing component settings 303, service level management component settings 304, resource manager component settings 305 and/or syndication component settings 306. Each of settings 302-306 may include settings or parameters which are to be applied to components 122-126 of FIG. 1. In system 300 of FIG. 3, metadata 301 may be received by metadata receiving module 340. Use management module 335 may be configured to access received metadata 301 to determine how hosting module 330 is to host the user-submitted services. In some cases, each of components 122-126 (e.g. SDP components 315) may be configured to may be configured to query hosting module 330 (e.g. in query 316) to determine whether new or updated settings for the corresponding component have been received. If so, module 330 sends response 317 to each corresponding component indicating whether new or updated component settings (302-306) have been received. In this manner, a user may be able to upload a service and, with minimal effort, implement one or more of the many resources available through the online service's service delivery platform components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a server computer system in a computer networking environment comprising a plurality of computing systems, a method for providing an online service configured for hosting a plurality of different client-submitted services according to client-submitted use information corresponding to each of the client-submitted services, the online service comprising a service delivery platform that includes a plurality of service delivery platform components that process inputs received from each of the client-submitted services that are hosted by the online service, the method comprising:

an act of configuring an online service for hosting a plurality of different client-submitted services, the online service comprising a service delivery platform that includes a plurality of service delivery platform components that process inputs received from each of the client-submitted services to configure the plurality of service delivery platform components in an appropriate manner for hosting each of the client-submitted services;

an act of the online service receiving a service request from a client for a client-submitted service to be hosted on behalf of the client by the online service so that the client-submitted service is available to one or more customers, the service request including at least one client-submitted service configured for hosting by the online service and at least one portion of use information indicating how the plurality of service delivery platform components are to be used to host the client-submitted service on behalf of the client;

an act of the online service processing the portion of use information received with the service request to configure the plurality of service delivery platform components in an appropriate manner for hosting the client-submitted service; and an act of the online service providing the hosted client-submitted service to the one or more customers on behalf of the client in the appropriate manner as determined by the accessed portion of use information.

2. The method of claim 1, wherein the portion of use information includes at least a portion of metadata corresponding to one or more of the plurality of service delivery platform components, the metadata including settings to be applied to the plurality of service delivery platform components.

3. The method of claim 2, wherein at least one of the plurality of service delivery platform components comprises a provisioning component configured to manage client and customer access rights regarding the client-submitted service, and wherein the portion of metadata includes at least one setting to be applied to the provisioning component for managing client and customer access rights for the client-submitted service.

4. The method of claim 3, wherein the provisioning component queries the metadata to determine which resources associated with the client-submitted service are to be provisioned.

5. The method of claim 2, wherein at least one of the plurality of service delivery platform components comprises a billing component configured to generate customer billing information regarding use of the client-submitted service, and wherein the portion of metadata includes at least one setting to be applied to the billing component for generating customer billing information for the client-submitted service.

6. The method of claim 5, wherein the billing component includes an aggregation engine configured to generate billable units according to at least one of a usage based and a subscription based system.

7. The method of claim 1, wherein at least one of the plurality of service delivery platform components comprises a service level management component configured to:

monitor one or more quality of service metrics associated with the hosting of the client-submitted service; and report the informational results of the quality of service monitoring to the client that submitted the client-submitted service to the online service.

8. The method of claim 7, wherein the service level management component is configured to communicate with a trusted third party to determine compliance with a service level agreement.

9. The method of claim 1, wherein at least one of the service delivery platform components comprises a resource manager component configured to monitor and control expenditure of various server computer system resources.

10. The method of claim 9, wherein the resource manager component is configured to work with a billing component to generate billable units corresponding to any resource overuses by online service clients.

11. The method of claim 1, wherein at least one of the service delivery platform components comprises a syndication component configured to bundle a plurality of the services and provide them to other clients.

12. The method of claim 11, wherein one or more components of the online service are incorporated into the services bundle for distribution to other clients.

13. The method of claim 1, wherein the online service is configured to communicate with and integrate with a plurality of other online services functioning as service delivery platforms.

14. The method of claim 1, wherein substantially complete data isolation is provided for each client-submitted service.

15. One or more physical computer storage devices having stored thereon computer-executable instructions that, when executed by one or more processors of a computing system, cause the computing system to perform a method for providing an online service configured for hosting a plurality of different client-submitted services according to client-submitted metadata corresponding to each of the client-submitted services, the online service comprising a service delivery platform that includes a plurality of service delivery platform components that process inputs received from each of the client-submitted services that are hosted by the online service, the method comprising:
- an act of configuring an online service for hosting a plurality of different client-submitted services, the online service comprising a service delivery platform that includes a plurality of service delivery platform components that process inputs received from each of the client-submitted services to configure the plurality of service delivery platform components in an appropriate manner for hosting each of the client-submitted services;
- an act of the online service receiving a service request from a client for a client-submitted service to be hosted on behalf of the client by the online service so that the client-submitted service is available to one or more customers, the service request including at least one client-submitted service configured for hosting by the online service and at least one portion of customized metadata indicating how each of the plurality of service delivery platform components is to be used to host the client-submitted service on behalf of the client;
- an act of the online service processing the portion of customized metadata received with the service request to configure the plurality of service delivery platform components in an appropriate manner for hosting the client-submitted service according to metadata specific to each service delivery platform component; and
- an act of the online service providing the hosted client-submitted service to the one or more customers on behalf of the client in the appropriate manner for each service delivery platform component as determined by the customized metadata.

16. The one or more physical computer storage devices of claim 15, wherein the customized metadata allows for seamless integration between client-submitted services and the online service.

17. The one or more physical computer storage devices of claim 15, wherein the online service is scalable to host virtually any number of client-submitted services.

18. The one or more physical computer storage devices of claim 15, wherein the metadata indicates selection of a subset of service delivery platform components that are to be used in conjunction with hosting the client-submitted service.

19. A computer system comprising the following:
one or more processors;
system memory;
an online service configured for hosting a plurality of different client-submitted services according to client-submitted use information corresponding to each of the client-submitted services, the online service comprising a service delivery platform that includes a plurality of service delivery platform components that process inputs received from each of the client-submitted services that are to be hosted by the online service, the components including the following:
- a provisioning component configured to manage client access rights regarding a client-submitted service;
- a billing component configured to generate customer billing information regarding use of the client-submitted service;
- a service level management component configured to monitor one or more quality of service metrics associated with the hosting of the client-submitted service and report the informational results of the quality of service monitoring to the client;
- a resource manager component configured to monitor and control expenditure of various host computer system resources; and
- a syndication component configured to bundle a plurality of client-submitted services and provide them to other clients;

a receiving module configured to receive a service request from a client for a client-submitted service to be hosted on behalf of the client by the online service so that the client-submitted service is available to one or more customers, the service request including at least one client-submitted service configured for hosting by the online service and at least one portion of use information indicating how the plurality of service delivery platform components are to be used to host the client-submitted service on behalf of the client;

an processing module configured to process the portion of use information received with the service request to determine an appropriate manner for hosting the client-submitted service; and an online service providing module configured to provide the hosted client-submitted service to one or more customers on behalf of the client in the appropriate manner as determined by the accessed portion of use information.

* * * * *